United States Patent [19]

Dodge et al.

[11] Patent Number: 5,631,767

[45] Date of Patent: May 20, 1997

[54] METHOD AND APPARATUS FOR LASER BEAM MANAGEMENT

[75] Inventors: Timothy J. Dodge, Pineville; Thomas E. Iradi, Matthews; Divya C. Patel, Pineville, all of N.C.

[73] Assignee: Litton Systems, Inc., Charlotte, N.C.

[21] Appl. No.: 610,581

[22] Filed: Mar. 7, 1996

Related U.S. Application Data

[62] Division of Ser. No. 282,899, Jul. 29, 1994, Pat. No. 5,592,325.

[51] Int. Cl.$^6$ ................................................. G02F 1/37
[52] U.S. Cl. .......................... 359/328; 252/584; 252/587
[58] Field of Search ................................. 359/326–332; 252/582, 584, 587; 385/122

[56] References Cited

U.S. PATENT DOCUMENTS

| | | |
|---|---|---|
| 3,949,323 | 4/1976 | Bierlein et al. . |
| 4,451,733 | 5/1984 | Avery et al. . |
| 4,747,673 | 5/1988 | Marrs et al. . |
| 4,864,098 | 9/1989 | Basanese et al. . |
| 4,884,277 | 11/1989 | Anthon et al. . |
| 4,909,964 | 3/1990 | Clement et al. ............... 359/328 X |
| 4,917,451 | 4/1990 | Chouinard et al. . |
| 4,948,973 | 8/1990 | Comeyne . |
| 4,961,631 | 10/1990 | Clement et al. ............... 359/328 X |
| 4,962,979 | 10/1990 | Anderson et al. . |
| 4,968,892 | 11/1990 | McAtee . |
| 5,015,417 | 5/1991 | Clement et al. ............... 252/587 |
| 5,144,630 | 9/1992 | Lin . |
| 5,193,097 | 3/1993 | Bordui et al. . |
| 5,253,258 | 10/1993 | Lawandy ...................... 359/326 X |
| 5,268,913 | 12/1993 | Sakowski et al. . |

OTHER PUBLICATIONS

*Materials for High Power Second Harmonic Generation*, J. K. Tyminski et al.; SPIE vol. 1223 Solid State Lasers (1990), pp. 66–74. [No Month].

*Frequency Doubling of 1.053 μm Radiation in KTP*, M. Dreger et al.; Nuclear Instruments and Methods in Physics Research A318 (1992) pp. 921–923. [No Month].

*Second–Harmonic Generation Green Laser for Higher–Density Optical Disks*, M. Oka, Jpn. J. Appl. Phys. vol. 31 (1992), pp. 513–518, Feb. 1992.

*Inclusion Tuning of Nonlinear Optical Materials; KTP Isomorphs*, M. L. Phillips et al.; Solid State Ionics 32/33 (1989) pp. 147–153. [No Month].

*Observation of Raman Scattering and Fluorescent Spectra of KTIOPO (KTP) Crystal*, L. Xu et al., Institute of Physics, SPIE vol. 1319 Optics in Complex Systems (1990), p. 500. [No Month].

*Frequency Doubling to 659 nm in KTP*, D. E. Johnson et al.; SPIE vol. 1626 Nonlinear Optics III (1992), pp. 50–54. [No Month].

*Optical Absorption of KTP Single Crystals*, J. Mangin et al., Phys. Stat. Sol. (a) 120, (1990) pp. K111–K116. [No Month].

*Green Light From Doubled Nd: YAG Lasers*, B. G. Huth et al., Oct., 1987, pp. 59–61.

Quantex Photonic Product Brochure and Price List, Apr. 30, 1993, 4 pp.

Litton brochure entitled, KTP (undated), 8 pp.

*A Powder Technique for the Evaluation of Nonlinear Optical Materials*, S. K. Kurtz et al., Journal of Applied Physics, vol. 39 No. 8, Jul. 1968, pp. 3798–3813.

*Primary Examiner*—John D. Lee
*Attorney, Agent, or Firm*—Bell, Seltzer, Park & Gibson, P.A.

[57] ABSTRACT

A method and associated structures are disclosed for locating a laser beam that has a wavelength outside of the visible portion of the electromagnetic spectrum. The method comprises positioning a sample of a polycrystalline nonlinear frequency converting compound generally linearly downstream from a laser source, and then detecting the emission from the polycrystalline frequency converting compound to thereby identify the position of the original laser beam. In preferred embodiments, the polycrystalline nonlinear frequency converting compound comprises KTP.

13 Claims, 1 Drawing Sheet

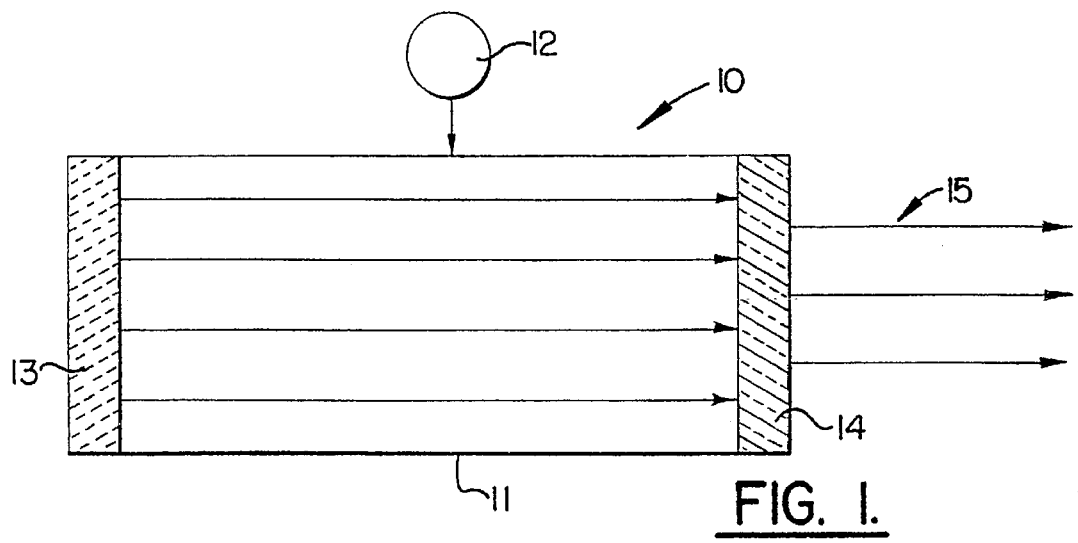
FIG. 1.
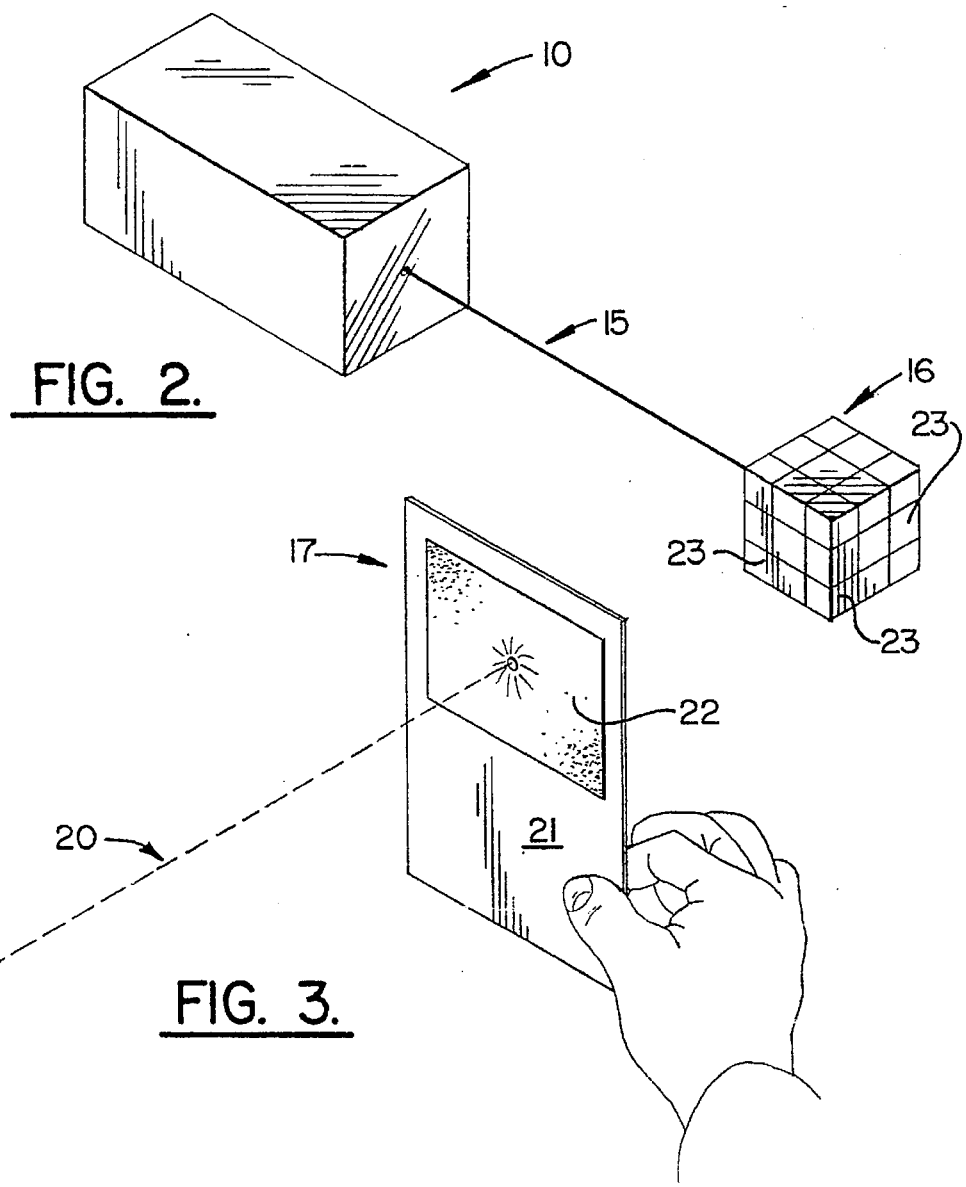
FIG. 2.
FIG. 3.

METHOD AND APPARATUS FOR LASER BEAM MANAGEMENT

This application is a division of Ser. No. 08/282,899 filed Jul. 29, 1994, now U.S. Pat. No. 5,592,325.

FIELD OF THE INVENTION

The present invention relates to the management of laser beams, and in particular relates to the management of high powered laser beams whose output is normally outside of the visible portion of the electromagnetic spectrum.

BACKGROUND OF THE INVENTION

Lasers are devices that use the principle of amplification of electromagnetic waves by stimulated emission, and the term "laser" is an acronym for "light amplification by stimulated emission of radiation." Lasers can operate in the infrared, visible or ultraviolet regions of the electromagnetic spectrum.

The operation and theory of lasers are well understood by those of ordinary skill in this art. In brief description, a laser is a device that pumps (i.e., adds energy to) a collection of atoms or molecules to bring them to a condition in which more are initially in an excited state than an unexcited state. In this condition, an incident wave of electromagnetic energy will stimulate more emission than it will absorption, resulting in a net amplification of the incident light.

Laser light's most characteristic aspect is its coherence; i.e., laser light is highly monochromatic (single wavelength), directional, and in phase. In contrast, most ordinary light sources such as an ordinary light bulb emit light of many wavelengths in substantially all directions with random phase.

A second characteristic of certain types of lasers is their ability to produce emitted light at very high power levels. For example, lasers in which the stimulated atoms are neodymium (Nd), often present in crystals such as yttrium aluminum garnet ("YAG"), can produce continuous output powers up to several kilowatts. Even higher peak powers can be obtained by other lasers using special techniques such as Q switching and mode locking familiar to those of ordinary skill in this art. Accordingly, lasers are in common use that have sufficient energy to weld, alloy, cut or otherwise induce high temperature reactions in metals and other substances. Less powerful lasers are also used in many other fields of industry, as well as in medicine, in which laser light can be used for both illumination and surgical purposes.

As noted above, certain types of lasers produce their coherent light in portions of the spectrum (particularly infrared) that are outside of the visible portion of the spectrum. As is well understood by those of ordinary skill in a number of arts, the electromagnetic spectrum covers a wide range of energy, and the visible spectrum generally refers to light having a wavelength of between about 400 nanometers (nm) and 750 nm. Infrared light tends to have a longer wavelength than light in the visible spectrum (i.e., more than 750 nm), and ultraviolet light tends to have a shorter wavelength (i.e., less than 400 nm). As is further known to those of ordinary skill in many arts, wavelength is inversely proportional to the frequency of the wave, and frequency is directly proportional to the energy of the event producing the wave. Thus, longer wavelengths represent lower energy transitions, while shorter wavelengths represent higher energy transitions.

As noted above, one particularly useful type of laser is neodymium (Nd) maintained in a YAG crystal matrix, sometimes abbreviated as a "Nd:YAG" laser. Depending upon several factors, such a laser will produce light with a wavelength of about 1064 nm (1.064 microns) which is within the infrared rather than the visible portion of the spectrum.

Working with such an "invisible" laser beam presents problems both at low and high power levels.

First, at any power level, the exact location of a laser beam generally must be known at almost all times. The beam's location with respect to the object that it may be intended to strike is often critical to the process, experiment, or technique being carried out. More importantly, at high power levels, stray beams can cause serious damage to persons and equipment. For example, when dealing with high powered infrared lasers, a reflected beam with as little as 3% or 4% of the original power of the beam is still capable of burning many common objects, and causing serious bodily harm to persons.

Accordingly, lower power invisible beams must be identified, and higher power beams must be both located and controlled ("managed") in some fashion that prevents them from damaging surrounding objects and persons. One aspect of such management is referred to as "dumping" a laser beam and the apparatus used to carry it out is also referred to as a "laser dump" or a "beam dump." The theoretical goal of a beam dump is to absorb the laser light and its associated power and transfer or convert it into another more manageable and less hazardous form.

The most common devices used to locate beams outside of the visible spectrum, particularly for infrared lasers, are beam "cards" or "catchers" which generally consist of a phosphorescent ("phosphor") composition on a card-like substrate. When placed in position generally in front of the infrared laser beam, the phosphor card emits light in the visible region through a phosphorescence mechanism, the basics of which are well understood by those of ordinary skill in this art and will not be discussed further herein. The phosphor cards, however, suffer from a number of problems. First, phosphor compounds tend to "burn in" upon repeated use, and the cards progressively lose their effectiveness. Additionally, a number of the typical phosphor compounds used in such cards need to be regenerated between use. The cards thus must be left in a lighted environment or have their phosphorescence capacity refreshed in some other manner.

At high powers, the disadvantages become even more severe because high power lasers can destroy the phosphor cards relatively quickly.

There thus exists the need for an improved locator card for infrared lasers of both low and high power outputs.

With respect to beam dumping or other types of beam attenuation, a number of techniques are generally attempted. These include bulk absorption, reflective management, neutral density filters, prism polarizers, and Brewster wedges. Each of these suffers various disadvantages with respect to high power laser beams. In particular, and as noted above, some infrared laser beams are so powerful that even if a small percentage is reflected (for example from the window of a beam dump), it can still do serious damage to persons and equipment. Bulk absorption plates generally consist of semitransparent glass which manages the beam by absorbing a portion of the incident light falling on it. At high incident powers, however, bulk absorption plates tend to fail from optical bleaching or outright fracture.

Prisms have similar disadvantages, and in particular, when high powered laser beams pass through the transparent material of the prisms, the localized heating tends to cause spatial distortion in the transmitted beams which can be unacceptable in certain circumstances, particularly where coherence is required after beam management or "attenuation." Generally speaking, such prism polarizers (e.g., Glan-laser prisms) are unsuitable for use at high power levels.

Brewster wedges likewise create a lot of distortion, and in particular circumstances a large number of such wedges must be used and carefully aligned. The process is tedious and expensive.

OBJECT AND SUMMARY OF THE INVENTION

Therefore, it is an object of the present invention to provide beam locators and beam dumps that can both detect and manage laser beams outside of the visible portion of the electromagnetic spectrum, and high powered beams in particular.

The invention meets this object with a beam locator and a beam dump, each of which incorporates a polycrystalline nonlinear frequency-converting compound to locate and manage such laser light, particularly high powered infrared laser radiation. In another aspect, the invention is a method of making the locator and the beam dump, and in yet another aspect comprises the methods of locating a laser beam and managing or dumping the beam.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DESCRIPTION OF THE DRAWINGS

FIG. 1 is a schematic diagram of a basic laser structure;

FIG. 2 is a schematic perspective view of a laser, laser beam, and beam dump according to the present invention; and FIG. 3 is a schematic environmental view of a locator card according to the present invention and illustrating its method of use.

DETAILED DESCRIPTION

In a first aspect, the present invention is a laser beam locator which comprises a substrate, and a polycrystalline nonlinear frequency-converting compound on the substrate. In another aspect, the invention comprises a beam dump formed of the polycrystalline nonlinear frequency-converting compound. In yet other aspects, the invention comprises a method of locating a laser beam using the polycrystalline nonlinear frequency-converting compound, a method of dumping a laser beam using the compound, and a method of making a locator card of the type described herein.

FIG. 1 is a schematic illustration of a laser broadly designated at 10. As noted earlier, the theory and operation of lasers and the characteristics of laser light are well understood by those of ordinary skill in this art and will not otherwise be described in detail. FIG. 1 illustrates, however, that most lasers consist of an amplifier 11 which contains the atoms which are to be excited by the pump shown at 12. The amplifier 11 is bounded by two mirrors, one of which shown at 13 is fully reflective, and the other of which designated at 14 is partially transparent. When the atoms are pumped in the amplifier 11, the resulting emitted light reflects back and forth in the amplifier 11 between the mirrors 13 and 14 until it obtains enough power to escape the amplifier as the laser light broadly designated at 15.

FIG. 2 is a perspective view in which the laser is again designated at 10 and illustrated schematically, and produces the laser beam which, for the sake of consistency, is again designated at 15. FIG. 2 also illustrates, however, an exemplary beam dump broadly designated at 16 which will be described in more detail herein with respect to the present invention.

FIG. 3 shows a laser beam locator according to the present invention broadly designated at 17 and in the form of a locator card. As illustrated by FIG. 3, such cards are typically of a size convenient and appropriate for the human hand. In FIG. 3, a laser beam having a wavelength outside the visible spectrum is illustrated as the dotted line broadly designated at 20. The beam locator comprises a substrate 21 and the polycrystalline nonlinear frequency-converting compound 22 on the surface of the substrate As known to those familiar with this art, a nonlinear frequency-converting compound is a crystalline material which, when electromagnetic waves are propagated through it, induces polarization waves with frequencies that are the sum and the difference of the frequencies of the original electromagnetic waves. In turn, these polarization waves can radiate new electromagnetic waves having the same frequency as the polarization waves.

For example, when an infrared laser beam strikes a frequency-doubling nonlinear crystal, the frequency is doubled, but the proportional wavelength is cut in half (because of the inverse relationship between frequency and wavelength). In an Nd:YAG laser, the net effect is to take a beam of radiation at 1064 nm and convert it to one of 532 nm. As noted earlier herein, a 532 nm wavelength falls well within the visible region of the spectrum, although the original 1064 nm radiation did not.

This characteristic is also referred to as harmonic generation. Frequency conversion crystals such as those incorporated in the present invention can provide second harmonic generation, third harmonic generation, fourth harmonic generation, and fifth harmonic generation. These respectively convert a laser's output into shorter wavelengths one-half, one-third, one-fourth, and one-fifth of the fundamental wavelength.

As understood by those of ordinary skill in this art, third harmonic generation and above must be generated in successive stages. Second harmonic generation can, however, be generated in a single stage.

As used herein, the term "polycrystalline" refers to a material which contains many small crystals of either the same or different polytype. The simplest definition of polycrystalline is a solid composed of many crystals. In certain compounds, these many crystals will all have the same polytype (crystal structure), while in other materials that exhibit polymorphism (the ability of a solid to exist in more than one form), a polycrystalline material can contain a variety of polytypes.

When a laser beam strikes such a compound, the polycrystalline nature of the nonlinear frequency-converting compounds of the present invention convert the frequency of the beam and then scatter it in many directions. The beam is scattered by the many crystals that it strikes, which are in generally random orientation with respect to one another.

The polycrystalline nonlinear frequency-converting compound of the invention can be selected from among those having frequency-converting characteristics sufficient to convert laser radiation from outside the visible portion of the spectrum (particularly the infrared portion), to radiation in the visible portion of the spectrum. A number of such compounds are defined and explained in U.S. Pat. No. 3,949,323 to Bierlein et al., which is incorporated entirely herein by reference. These compounds have the formula $MTiO(XO_4)$; wherein M comprises potassium (K), rubidium (Rb), cesium (Cs), thallium (Tl), or solid solutions of these; and X comprises phosphorus (P), arsenic (As), or solid solutions of phosphorus and arsenic. In a most preferred embodiment, the polycrystalline nonlinear frequency-converting compound comprises potassium titanyl phosphate ($KTiOPO_4$), also referred to as "KTP." Potassium titanyl phosphate was first synthesized in 1890, and its nonlinear characteristics and optical properties were more clearly identified in the 1970s. To date, KTP has been used as a frequency-doubling crystal (second harmonic generation), as an optical parametric oscillator ("OPO"), as an optical waveguide, and as a Pockel's cell material.

KTP has a unique combination of properties for such optical applications. These include a large temperature bandwidth, good thermal properties, large nonlinear optical coefficients that are phase-matchable, wide acceptance angles, and a good resistance to bulk optical damage. KTP also has a high optical transmission (i.e., low absorption) for radiation in the near infrared and mid-infrared regions of the spectrum. Indeed, for such low frequency radiation, KTP is essentially transparent. This gives KTP its excellent operating characteristics as a frequency doubler for lasers and related optical devices.

Other nonlinear frequency-converting compounds are useful in the present invention, although they cannot necessarily be grouped by formula. These include: lithium niobate (doped—e.g., MgO—or undoped) ($LiNbO_3$), yttrium aluminum borate, beta barium borate ($BaB_2O_4$, "BBO"), lithium triborate, potassium niobate, potassium dihydrogen phosphate ($KH_2PO_4$), $Ba_2NaNb_5O_{15}$, lithium iodate, iodic acid, $KB_5O_8 \cdot 4H_2O$, potassium lithium niobate, and urea.

The card's substrate 21 (FIG. 3) can be formed of a number of materials; for example, metals, polymers, glass, and ceramics. Polycarbonate is a preferred polymer, and anodized aluminum is a preferred metal.

In the preferred embodiment, KTP's properties make for an excellent locator card. First, KTP will show a 532 nm emission when struck by the typical 1064 nm output of an Nd:YAG laser. This 532 nm light generally appears green to the human eye. Second, because KTP doesn't emit based on phosphorescence or the chemicals that produce such phosphorescence, it does not suffer from the burn-out failures of the prior art devices. Similarly, the transmission characteristics of KTP permit it to avoid the type of optical damage that the same infrared radiation would cause in other materials.

As noted earlier herein, the use of KTP and related nonlinear frequency-converting compounds has application at low power for locating laser beams outside the visible spectrum, particularly infrared laser beams. Additionally, the polycrystalline nonlinear frequency-converting compounds of the present invention, including KTP, are useful as beam dumps for dissipating and managing the power output of high power lasers, particularly those in the infrared portion of the spectrum. As illustrated in FIG. 2, the beam dump 16 comprises a solid sample formed of the polycrystalline nonlinear frequency-converting compound, preferably KTP. More preferably, the solid sample comprises a solid polygon formed of the polycrystalline nonlinear frequency-converting compound, and in most preferable use, will comprise a plurality of such solid polygons positioned adjacent one another. FIG. 2 illustrates a plurality of cubes 23 used in such a fashion. In other words, individual solid polygons of the polycrystalline nonlinear frequency-converting compound of the invention can be stacked or arranged with and adjacent one another to form an appropriate beam dump for a variety of circumstances. Although FIG. 2 illustrates smaller cubes arranged to form a larger cube or rectangle, it will be understood that both the individual solid polygons and the plurality of polygons can take any number of geometric, or even random, shapes.

As in the beam locator embodiment, the polycrystalline nonlinear frequency-converting compound can be of the general formula $MTiO(XO_4)$ with the same qualifications for "M" "X." The compound preferably comprises potassium titanyl phosphate, but can also comprise the other frequency-converting compounds set forth earlier herein.

In yet another aspect, and as again illustrated by FIG. 3, the invention comprises a method of locating a laser beam that has a wavelength outside of the visible portion of the electromagnetic spectrum. In this aspect, the method comprises positioning a sample of the polycrystalline nonlinear frequency-converting compound generally linearly downstream from a laser source, and then detecting the emission from the polycrystalline frequency-converting compound to thereby identify the position of the original laser beam.

The polycrystalline nonlinear frequency-converting compound is the same as described with respect to the other embodiments, and is preferably KTP. As beam locators, these compounds are most useful when they convert electromagnetic radiation outside the visible portion of the electromagnetic spectrum into radiation within the visible portion of the spectrum which is therefore expected to be visible by the normal human eye.

In yet another aspect, and as again illustrated by FIG. 2, the invention comprises a method of managing, and specifically dumping, a laser beam that comprises directing the beam at the polycrystalline nonlinear frequency-converting compounds of the present invention. More preferably, the invention comprises directing the beam at a solid polygon formed of the compound, and most preferably comprises directing the beam at a plurality of adjacent solid polygons, each of which is formed of the polycrystalline nonlinear frequency-converting compound. In FIG. 2, the individual cubes are designated at 23. As in the other embodiments, the polycrystalline nonlinear frequency-converting compound can be defined by the formulations already set forth. The compound preferably comprises KTP because of its ability to convert electromagnetic radiation outside the visible portion of the electromagnetic spectrum into radiation within the visible portion of the spectrum, and thus expected to be visible by a normal human eye.

In yet another aspect, the invention comprises a method of making a laser beam management material that is particularly useful for locating and dumping laser beams that are outside of the visible spectrum and of relatively high power. The method comprises forming a melt of potassium titanyl phosphate, casting the melt into a desired shape, and quenching the melt to form a polycrystalline solid of potassium titanyl phosphate. Although not wishing to be bound by any particular theory, it appears that the quenching of the melt is most useful in forming the polycrystalline material that gives the desired characteristics of the invention. As known to those familiar with this and related technologies, quenching refers to the rapid cooling of a melted material.

Under most circumstances and with many materials, the characteristics that result following quenching are to some extent the result of the rapid quenching step, as opposed to some other more orderly and slower cooling or solidification step.

In this aspect of the invention, the step of forming a melt of potassium titanyl phosphate can comprise heating solid potassium titanyl phosphate; i.e., one crystal, several crystals, or many crystals; to a temperature above KTP's melting point to thus obtain the melt.

Alternatively, the step of forming the melt can comprise admixing compounds containing potassium, titanium, oxygen and phosphorus, and then heating the admixture to a temperature greater than the melting temperature of the admixture and greater than the melting point of potassium titanyl phosphate. In this method, the preferred starting compounds for the admixture comprise potassium dihydrogen phosphate ($KH_2PO_4$) and titanium dioxide ($TiO_2$).

When potassium dihydrogen phosphate and titanium dioxide are used as the starting materials, the step of heating the admixture comprises heating these materials to a temperature of at least about 1200° C., and at which the admixture is completely molten, and then maintaining the admixture in the molten state for at least six hours, and preferably eight hours or longer.

In order to produce a locator card as illustrated in FIG. 3, the step of casting and quenching the melt comprises casting the melt onto a metal sheet in order to quench it and form a layer of polycrystalline KTP on the sheet. When the metal sheet is suitable for the card substrate, the quenching step can comprise casting the melt directly onto the card substrate.

Alternatively, where solid polygons such as those illustrated at 16 and 23 in FIG. 2 are desired, the step of casting the melt can comprise casting the melt into a mold to thereby form the solid polygons of polycrystalline potassium titanyl phosphate.

In summary, the frequency conversion provided by KTP and related compounds for beam locating, dumping, and other management, is much better than that of currently available products for these applications. KTP has an excellent damage threshold, thus making it quite useful for repeated use or use under extreme conditions. The technology required to manufacture the material is relatively straightforward and to some extent relatively well-developed with only minor modifications required compared to previous processes.

As a beam dump, the very high damage threshold of KTP provides the advantages of effective energy scattering to reduce the intensity of laser light incident upon it, as well as radiative transfer to convert much of the 1064 nm radiation to 532 nm radiation without generating excessive heat and with excellent transmission to facilitate the scattering and the conversion throughout a thick sample.

Finally, the frequency-doubling of KTP is independent of wavelength over a range of input of between about 994 nm to about 2500 nm, thus permitting conversion of radiation other than the 1 micron range characteristic of infrared lasers.

In the drawings and specification, there have been disclosed typical preferred embodiments of the invention, and although specific terms have been employed, they have been used in a generic and descriptive sense only, and not for purposes of limitation, the scope of the invention being set forth in the following claims.

That which is claimed is:

1. A laser beam locator for converting laser light with wavelengths that are outside of the visible spectrum into wavelengths within the visible spectrum, said locator comprising:

a substrate selected from the group consisting of metals, polymers, glass, and ceramics; and a solid layer consisting of a polycrystalline nonlinear frequency converting harmonic generation compound on the surface of said substrate, and in which the many crystals are at generally random orientation to one another.

2. A beam locator according to claim 1 wherein said polycrystalline nonlinear frequency converting compound has the formula $MTiO(XO_4)$;

wherein M comprises potassium (K), rubidium (Rb), cesium (Cs), or thallium (Tl), or solid solutions thereof; and, wherein X comprises phosphorous (P), arsenic (As), or solid solutions of phosphorus and arsenic.

3. A beam locator according to claim 1 wherein said polycrystalline nonlinear frequency converting compound comprises potassium titanyl phosphate ($KTiOPO_4$).

4. A beam locator according to claim 1 wherein said polycrystalline nonlinear frequency converting compound is selected from the group consisting of: lithium niobate ($LiNbO_3$), doped lithium niobate, yttrium aluminum borate, beta barium borate ($BaB_2O_4$), lithium triborate, potassium niobate, potassium dihydrogen phosphate, $Ba_2NaNb_5O_{15}$, lithium iodate, iodic acid, $KB_5O_8 \cdot 4H_2O$, potassium lithium niobate, and urea.

5. A beam locator according to claim 1 wherein said polycrystalline nonlinear frequency converting compound is capable of converting laser radiation in the infrared portion of the spectrum to radiation in the visible portion of the spectrum.

6. A beam locator according to claim 5 wherein said polycrystalline nonlinear frequency converting compound is capable of converting electromagnetic radiation of about 1064 nanometer wavelength to about 532 nanometer wavelength.

7. A beam locator according to claim 1 wherein said substrate comprises a card.

8. A beam locator according to claim 7 wherein said card is formed of a material selected from the group consisting of metals, polymers, and ceramics.

9. A beam locator according to claim 7 wherein said card is formed of polycarbonate.

10. A beam locator according to claim 7 wherein said card is formed of anodized aluminum.

11. A beam locator according to claim 7 wherein said card is formed of glass.

12. A laser beam locator comprising:

a substrate selected from the group consisting of metals, polymers, glass, and ceramics; and a polycrystalline nonlinear frequency converting compound on said substrate, said compound having the formula $MTiO(XO_4)$, and in which the many crystals are at generally random orientation to one another;

wherein M comprises potassium (K), rubidium (Rb), cesium (Cs), or thallium (Tl), or solid solutions thereof; and, wherein X comprises phosphorous (P), arsenic (As), or solid solutions of phosphorus and arsenic.

13. A method of locating a laser beam that has a wavelength outside of the visible portion of the electromagnetic spectrum, the method comprising:

positioning a sample of a polycrystalline nonlinear frequency converting compound generally linearly downstream from a laser source, said polycrystalline nonlinear frequency converting compound having the formula $MTiO(XO_4)$, and in which the many crystals are at generally random orientation to one another;

wherein M comprises potassium (K), rubidium (Rb), cesium (Cs), or thallium (Tl), or solid solutions thereof, and;

wherein X comprises phosphorous (P), arsenic (As), or solid solutions of phosphorus and arsenic; and detecting the emission from the polycrystalline frequency converting compound to thereby identify the position of the original laser beam.

* * * * *